United States Patent
Hamm et al.

(10) Patent No.: US 6,925,735 B2
(45) Date of Patent: Aug. 9, 2005

(54) BUMPER, SKID PLATE AND ATTACHMENT SYSTEM FOR UTILITY VEHICLE

(75) Inventors: Nicholas Hamm, West Bend, WI (US); Steven Paul Dobrot, Sun Prairie, WI (US)

(73) Assignee: Deere & Co., Moline, IL (US)

( * ) Notice: Subject to any disclaimer, the term of this patent is extended or adjusted under 35 U.S.C. 154(b) by 0 days.

(21) Appl. No.: 10/232,836

(22) Filed: Aug. 30, 2002

(65) Prior Publication Data

US 2004/0041415 A1 Mar. 4, 2004

(51) Int. Cl.[7] .................................................. E01H 5/04
(52) U.S. Cl. .......................... 37/231; 293/115; 172/811
(58) Field of Search ................................. 293/117, 115; 37/231, 234; 172/811

(56) References Cited

U.S. PATENT DOCUMENTS

| | | | |
|---|---|---|---|
| 2,492,410 A | 12/1949 | Arps | |
| 2,537,553 A | 1/1951 | Schonauer | |
| 2,888,995 A | 6/1959 | Sorensen | |
| 3,662,174 A | 5/1972 | Wakeen et al. | |
| 4,099,760 A | 7/1978 | Mascotte et al. | |
| 4,163,627 A | 8/1979 | Schnittjer et al. | |
| 4,215,496 A | * 8/1980 | Wehr | 37/407 |
| 4,424,870 A | 1/1984 | Weiss | |
| 4,424,982 A | 1/1984 | Weiss | |
| 4,615,130 A | * 10/1986 | Racicot | 37/231 |
| 4,658,519 A | * 4/1987 | Quenzi | 37/231 |
| 4,659,102 A | 4/1987 | Stuhrmann et al. | |
| 4,747,612 A | 5/1988 | Kuhn | |
| 4,817,728 A | * 4/1989 | Schmid et al. | 37/231 |
| 4,825,570 A | * 5/1989 | Schmid et al. | 37/231 |
| 4,950,010 A | * 8/1990 | Denny | 293/117 |
| 4,962,599 A | * 10/1990 | Harris | 37/235 |
| 5,036,608 A | * 8/1991 | Ciula | 37/231 |

(Continued)

Primary Examiner—H. Gutman
(74) Attorney, Agent, or Firm—The Law Office of Randall T. Erickson, P.C.

(57) ABSTRACT

A bumper assembly for a utility vehicle includes both front bumper structure for protecting the front of the vehicle, and skid plate structure to protect lower components of the vehicle from road or terrain hazards, as an integrated part. The bumper assembly includes a protective front structure extending substantially vertically in front of a front end of the vehicle hood, e.g., in front of the radiator of the utility vehicle. The bumper assembly also includes a protective bottom structure extending substantially horizontally beneath the chassis of the utility vehicle. The bumper assembly includes a front plate useful for locating attachments to the vehicle. An implement attachment arrangement includes an elongated structure pivotally connected at a rear of a chassis of the utility vehicle. The elongated structure is connected at a front end thereof to the bumper assembly via a hydraulic cylinder in order to make vertically adjustable the elevation of the front end of the elongated structure. The elongated structure provides an implement mounting bracket or coupling at a front end thereof. An implement having a compatible base is engageable to the implement mounting bracket.

19 Claims, 16 Drawing Sheets

U.S. PATENT DOCUMENTS

| | | | | |
|---|---|---|---|---|
| 5,082,065 A | * | 1/1992 | Fletcher | 37/231 |
| 5,190,437 A | | 3/1993 | Perry | |
| 5,193,296 A | * | 3/1993 | Reilley | 37/231 |
| 5,195,261 A | * | 3/1993 | Vachon | 37/231 |
| 5,224,816 A | | 7/1993 | Kaczmarczyk et al. | |
| 5,277,465 A | | 1/1994 | Weir | |
| D344,059 S | | 2/1994 | DeBraal et al. | |
| D347,614 S | | 6/1994 | DeBraal et al. | |
| 5,329,708 A | * | 7/1994 | Segorski et al. | 37/231 |
| 5,346,018 A | * | 9/1994 | Koster | 37/231 |
| 5,388,950 A | | 2/1995 | Schmahl et al. | |
| D365,573 S | | 12/1995 | Westimayer et al. | |
| 5,509,710 A | | 4/1996 | Eavenson, Sr. et al. | |
| 5,615,814 A | * | 4/1997 | Dechant | 37/231 |
| 5,636,885 A | | 6/1997 | Hummel | |
| 5,666,747 A | * | 9/1997 | MacQueen | 37/231 |
| 5,695,228 A | | 12/1997 | Storer | |
| 5,707,072 A | * | 1/1998 | Hopper | 280/491.5 |
| 5,743,339 A | | 4/1998 | Alexander, III | |
| 5,815,956 A | * | 10/1998 | Lavin et al. | 37/231 |
| 5,829,174 A | * | 11/1998 | Hadler et al. | 37/231 |
| 5,941,329 A | | 8/1999 | Ichioka et al. | |
| 5,950,336 A | * | 9/1999 | Liebl | 37/231 |
| 6,152,504 A | | 11/2000 | Dickson et al. | |
| D439,549 S | | 3/2001 | Shambeau et al. | |
| 6,238,004 B1 | | 5/2001 | Hansen et al. | |
| 6,290,271 B1 | * | 9/2001 | Geisler | 293/115 |
| 6,295,892 B1 | * | 10/2001 | Roy et al. | 74/532 |
| 6,318,773 B2 | | 11/2001 | Storer | |
| 6,334,269 B1 | * | 1/2002 | Dilks | 37/231 |
| 6,347,671 B1 | | 2/2002 | Stiller et al. | |
| 6,460,907 B2 | * | 10/2002 | Usui | 293/115 |
| 6,460,916 B2 | | 10/2002 | Mizuta | |
| 6,484,421 B1 | * | 11/2002 | Donoghue | 37/231 |
| 6,502,334 B1 | * | 1/2003 | Davies | 37/231 |
| 6,526,677 B1 | * | 3/2003 | Bloxdorf et al. | 37/231 |
| 2004/0079002 A1 | * | 4/2004 | Goy et al. | 37/231 |

* cited by examiner

BUMPER, SKID PLATE AND ATTACHMENT SYSTEM FOR UTILITY VEHICLE

TECHNICAL FIELD OF THE INVENTION

The present invention relates to utility vehicles. The present invention particularly relates to small utility vehicles having an operator station at the front of the vehicle and a cargo area located behind the operator station. The invention particularly relates to bumpers, skid plates, and attachments for utility vehicles.

BACKGROUND OF THE INVENTION

Small utility vehicles, such as John Deere GATOR® utility vehicles or John Deere heavy-duty utility vehicles have an operator station at a front of the vehicle and a cargo area located behind the operator station. Vehicles of this type are in common use since they are highly maneuverable, are equipped to operate over a low speed range, cause minimum turf damage due to their low tire pressures, and are readily adaptable to the use of a variety of special attachments utilized in maintenance or other activities.

Other examples of small utility vehicles or all-terrain vehicles are described in U.S. Pat. Nos. 6,238,004; Des 344,059; Des 347,614; and 5,509,710.

Small utility vehicles and all-terrain vehicles typically have a front bumper to protect the front of the vehicle from low speed impact and/or can be also used to act as a bumper for pushing with the vehicle. Typically these vehicles have a separate front skid plate to protect the front lower portion of the vehicle from impact with rocks or other obstacles.

It is sometimes necessary to attach implements or other attachments to the front of small utility vehicles. Some attachments can be added to current small utility vehicles but with difficulty and which sometimes requires modification to the base vehicle to accept such attachments.

The present inventors have recognized the desirability of providing an integrated front bumper and skid plate assembly that could also serve as a structural member of the overall vehicle frame. The present inventors have recognized the desirability of providing an integrated front bumper and skid plate assembly that could serve as an attaching location for front-mounted vehicle attachments such as a front winch or receiver hitch, tie down rings for tying down the vehicle and/or for vertical slinging, a lift unit for a front implement, a front brush guard, additional front ballast weight, or car carrier tie down hooks.

The present inventors have recognized the desirability of providing an integrated front bumper and skid plate assembly that serves as a structural support for a front-mounted implement, particularly as a support for a front-mounted implement coupling assembly.

The present inventors have recognized the desirability of providing an integrated front bumper and skid plate assembly that is easily removed to obtain access to mechanical equipment of the vehicle such as a front differential, and steering and cooling components of the vehicle.

The present inventors have recognized the desirability of providing an integrated front bumper and skid plate assembly that is cost effectively manufactured and installed.

SUMMARY OF THE INVENTION

The invention provides a bumper and skid plate structure and an attachment arrangement for a utility vehicle.

According to one aspect of the invention, a bumper assembly for a utility vehicle is provided. The bumper assembly includes both a front bumper structure for protecting the front of the vehicle and/or allowing the vehicle to be used to push, and a skid plate structure to protect front, lower components of the vehicle from road or terrain hazards.

Accordingly, the bumper assembly includes a protective front structure extending substantially upright in front of a front end of the vehicle hood, e.g., in front of the radiator of the utility vehicle. The bumper assembly also includes a protective bottom structure extending substantially horizontally beneath the chassis of the utility vehicle, the front and bottom structures being substantially continuous and fastened to the vehicle chassis as a unit. The bumper assembly can be formed by plural components welded or otherwise attached together, or formed as a unitary cast part.

The front structure can comprise a horizontal bar and at least two substantially upright members operatively connected to the horizontal bar, the two substantially upright members can be operatively connected to the bottom structure. A front plate can be arranged between the two substantially upright members, substantially closing the gap between the two substantially upright members. The front plate can be welded to the two substantially upright members.

The bottom structure can comprise two substantially horizontal rails and a bottom plate arranged between the two substantially horizontal rails, substantially closing the gap between the two substantially horizontal rails. The bottom plate can be welded to the two substantially horizontal rails.

The bumper can also comprise a substantially U-shaped bumper frame member connected between the horizontal bar and the two substantially upright members.

The bumper front plate can provide attachment locations for a front winch or receiver hitch, tie down rings for tying down the vehicle and/or for vertical slinging, a lift unit for a front implement, a front brush guard, additional front ballast weight, or car carrier tie down hooks. Accordingly, an appropriate quantity of holes, of appropriate shape and size can be provided through the front plate.

According to another aspect of the invention, an implement attachment arrangement includes an elongated structure pivotally connected at a rear of a chassis of a utility vehicle. The elongated structure can be vertically adjustable at a front end of the chassis. Preferably, the elongated structure is connected to the vehicle chassis at a front end via a connection to the bumper assembly. The elongated structure provides an implement mounting bracket or coupling at a front end thereof. An implement having a compatible base is engageable to the implement mounting bracket. A mechanism can be provided to vertically adjust the elevation of the front end of the elongated structure. Preferably, the mechanism is operable at the connection between the elongated structure and the bumper assembly.

According to a preferred embodiment, the implement mounting bracket comprises a substantially tapered face, and the implement base comprises a compatibly tapered channel sized to fit over and couple with the substantially tapered face.

A hydraulic cylinder can be connected at one end to the elongated structure and at another end to the chassis at a position elevated from the one end. Selective extension or contraction of the cylinder causes raising or lowering of the attachment plate.

Numerous other advantages and features of the present invention will be become readily apparent from the following detailed description of the invention and the embodiments thereof, from the claims and from the accompanying drawings.

DETAILED DESCRIPTION OF THE PREFERRED EMBODIMENTS

Figure 1:
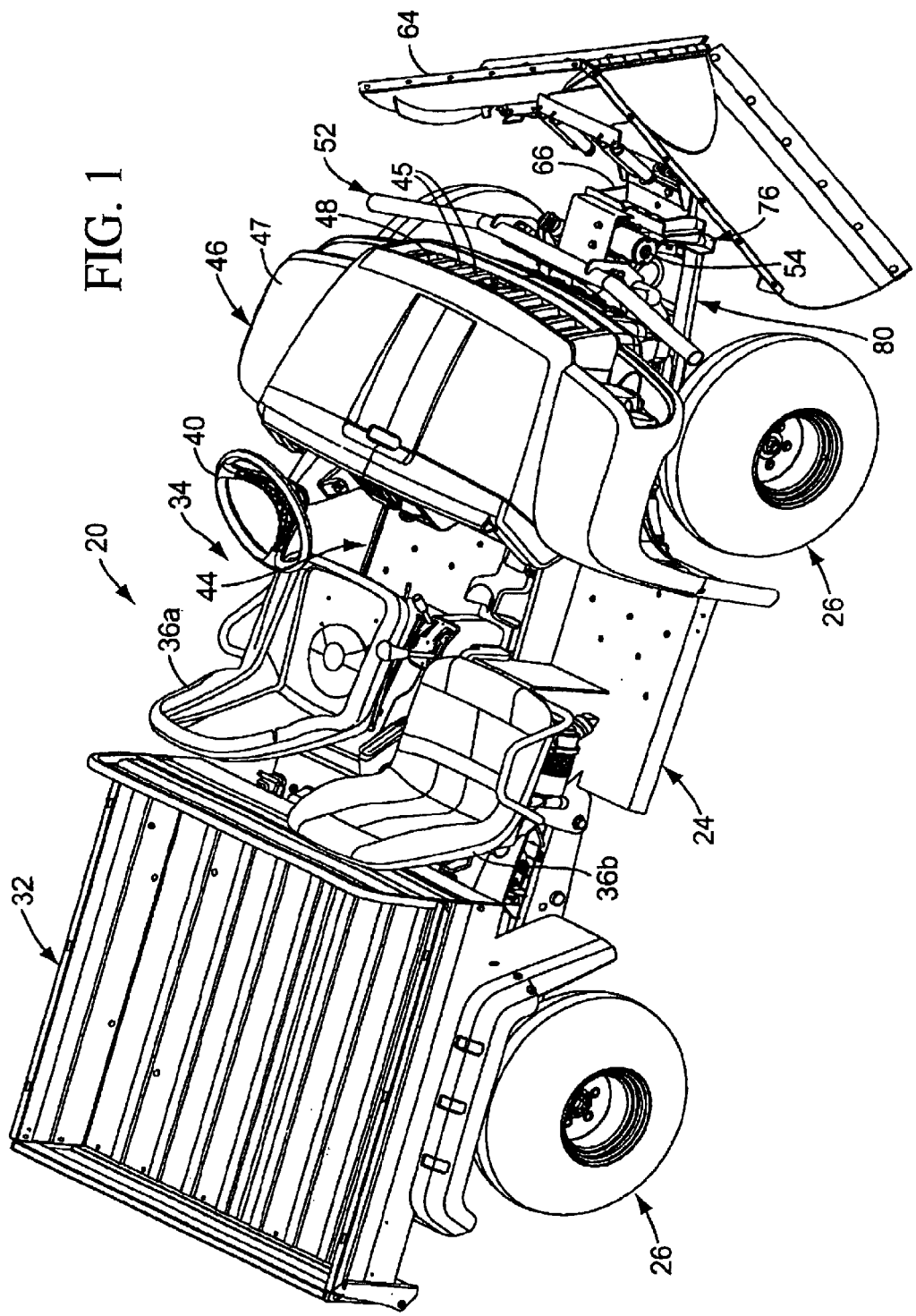
FIG. 1 is a perspective view of a utility vehicle incorporating the present invention.

While this invention may be embodied in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a utility vehicle 20 having a chassis 24 supported on a plurality of wheels 26. A cargo area 32 and a passenger area 34 are carried on the chassis 24. Two seats 36a, 36b are mounted in the passenger area 34. A steering wheel 40 and controls 44 are associated with a driver's seat 36a.

In front of the seats 36a, 36b is a compartment 46 covered by a hood 47. The compartment can house a radiator 49, shown schematically in FIG. 3, behind air openings 45. The air openings can be protected by a radiator grille 48. A bumper assembly 52 is mounted to the chassis 24 in front of the radiator grille 48. A hydraulic pump assembly 54 is mounted in front of the bumper assembly 52. The pump assembly includes an electric motor 56 that drives a hydraulic pump 58 (FIG. 2).

Figure 10:
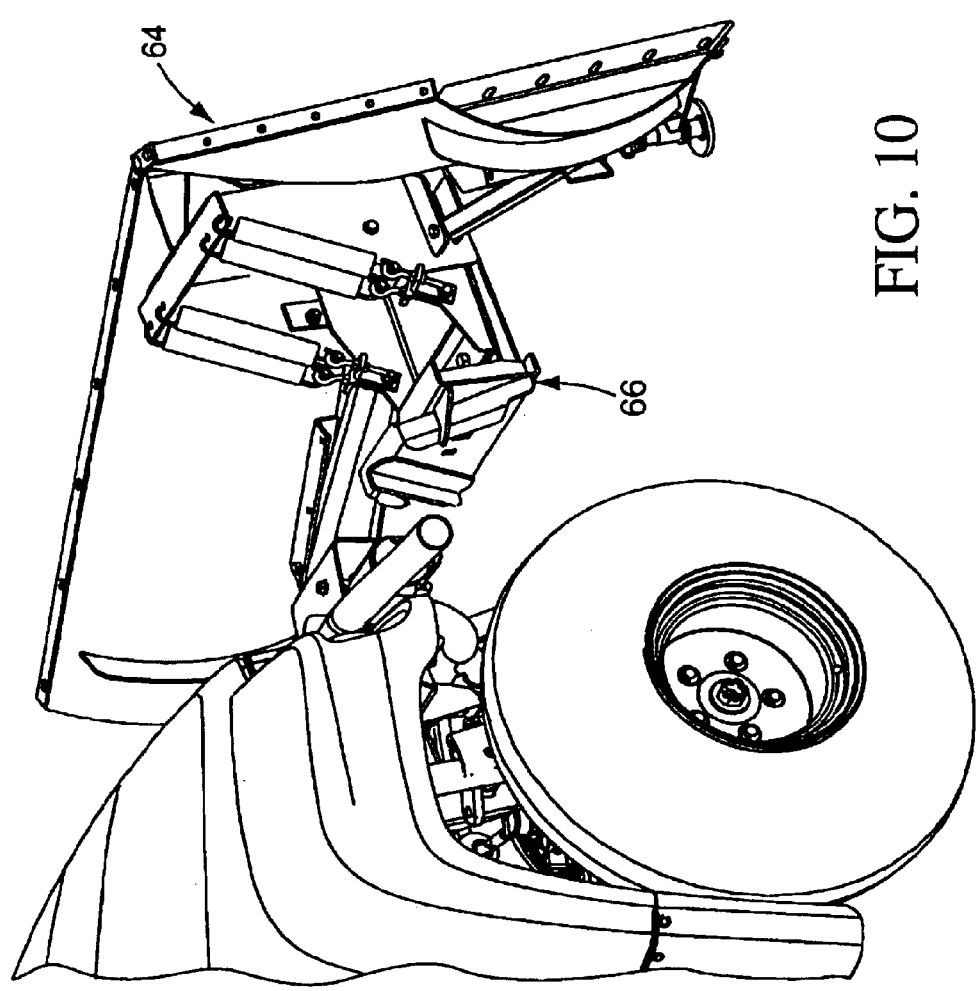
FIG. 10 is an enlarged fragmentary, exploded front perspective view of a portion of utility vehicle shown in FIG. 1.

An implement, such as a snow removal blade 64 (shown more clearly in FIG. 10) having an attachment base 66 is mounted to an attachment bracket 76 extending from an end of a frame assembly 80. The base 66 and the attachment bracket 76 are configured for quick coupling engagement. Although a snow removal blade 64 is illustrated, there are other implements which could be attached to the attachment bracket 76.

Figure 2:
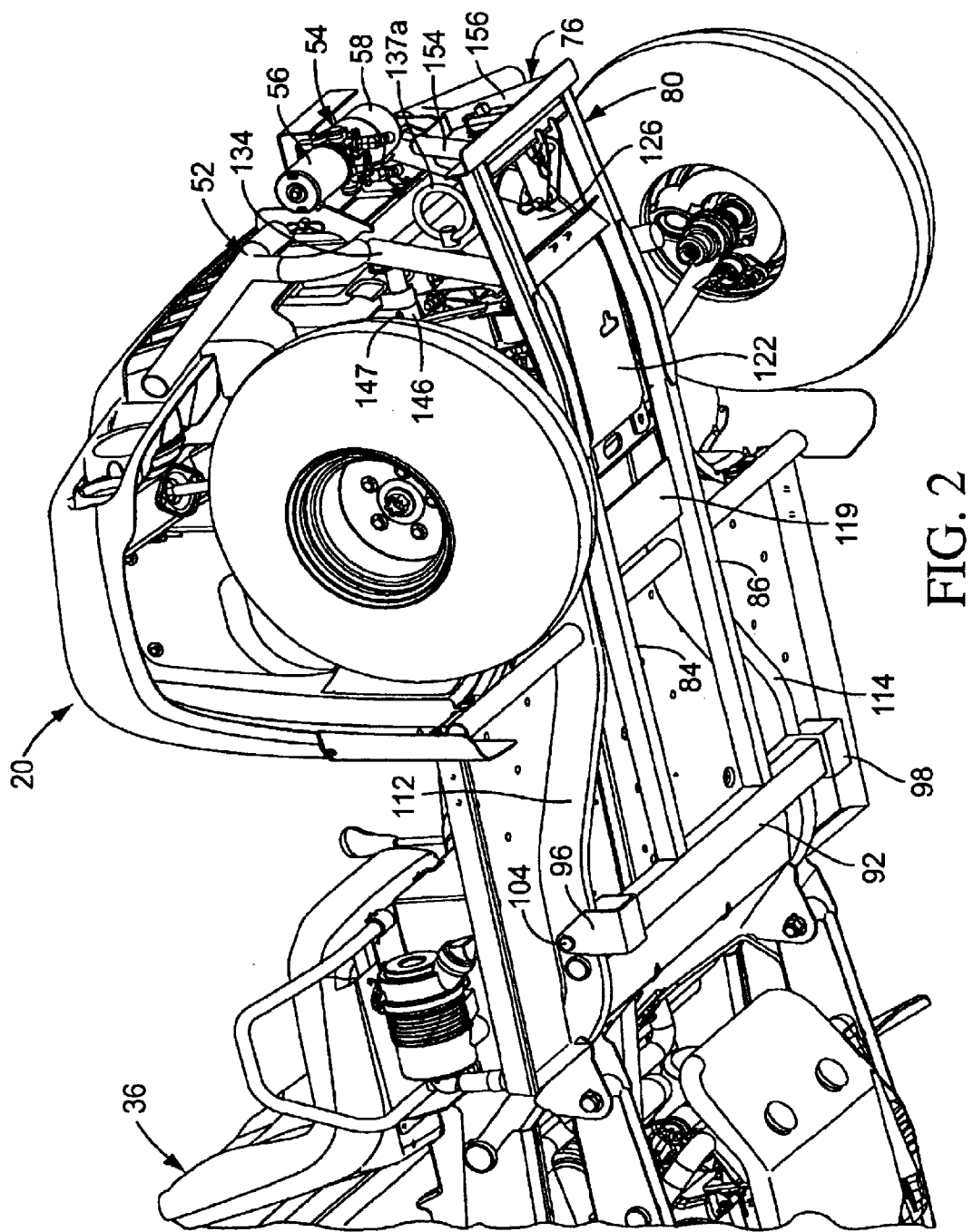
FIG. 2 is an enlarged, fragmentary, bottom perspective view of the utility vehicle shown in FIG. 1.

FIG. 2 illustrates the frame assembly 80 comprising longitudinally arranged rails 84, 86 fixed to a cross member 92. The rails are preferably rectangular cross section tubes. The cross member 92 is fixed to U-shaped brackets 96, 98. The U-shaped brackets are pivotally connected by pins 104,105 (FIG. 5) to frame rails 112,114 of the chassis 24. The frame assembly 80 is pivotal about a line passing longitudinally through axes of the pins 104,105. An intermediate cross member plate 119 connects the rails 84, 86.

The frame assembly 80 is preferably substantially composed of steel and rigid connections between members are preferably made by welding or fasteners.

Figure 3:
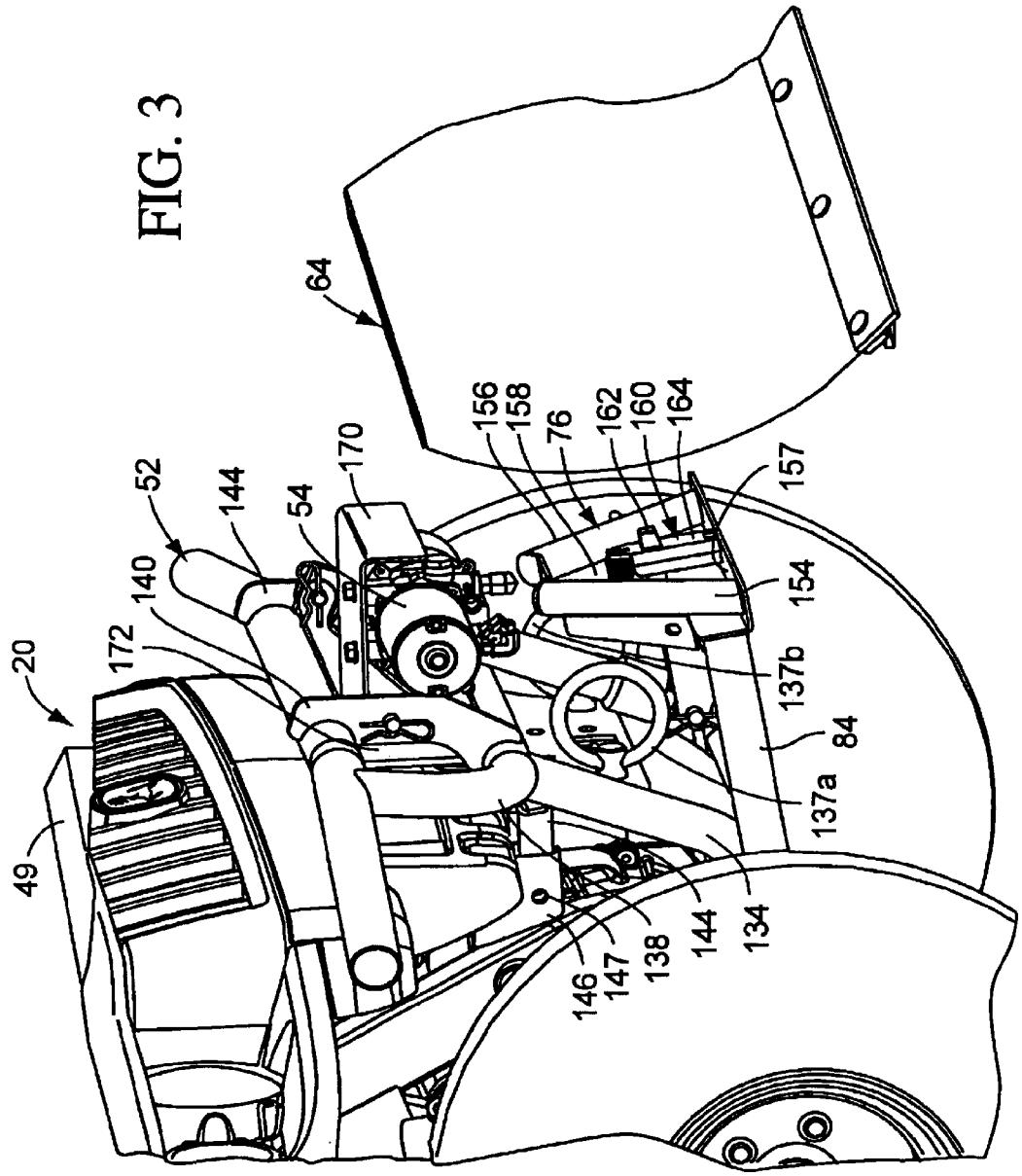
FIG. 3 is an enlarged, fragmentary, front perspective view of the utility vehicle shown in FIG. 1.
Figure 4:
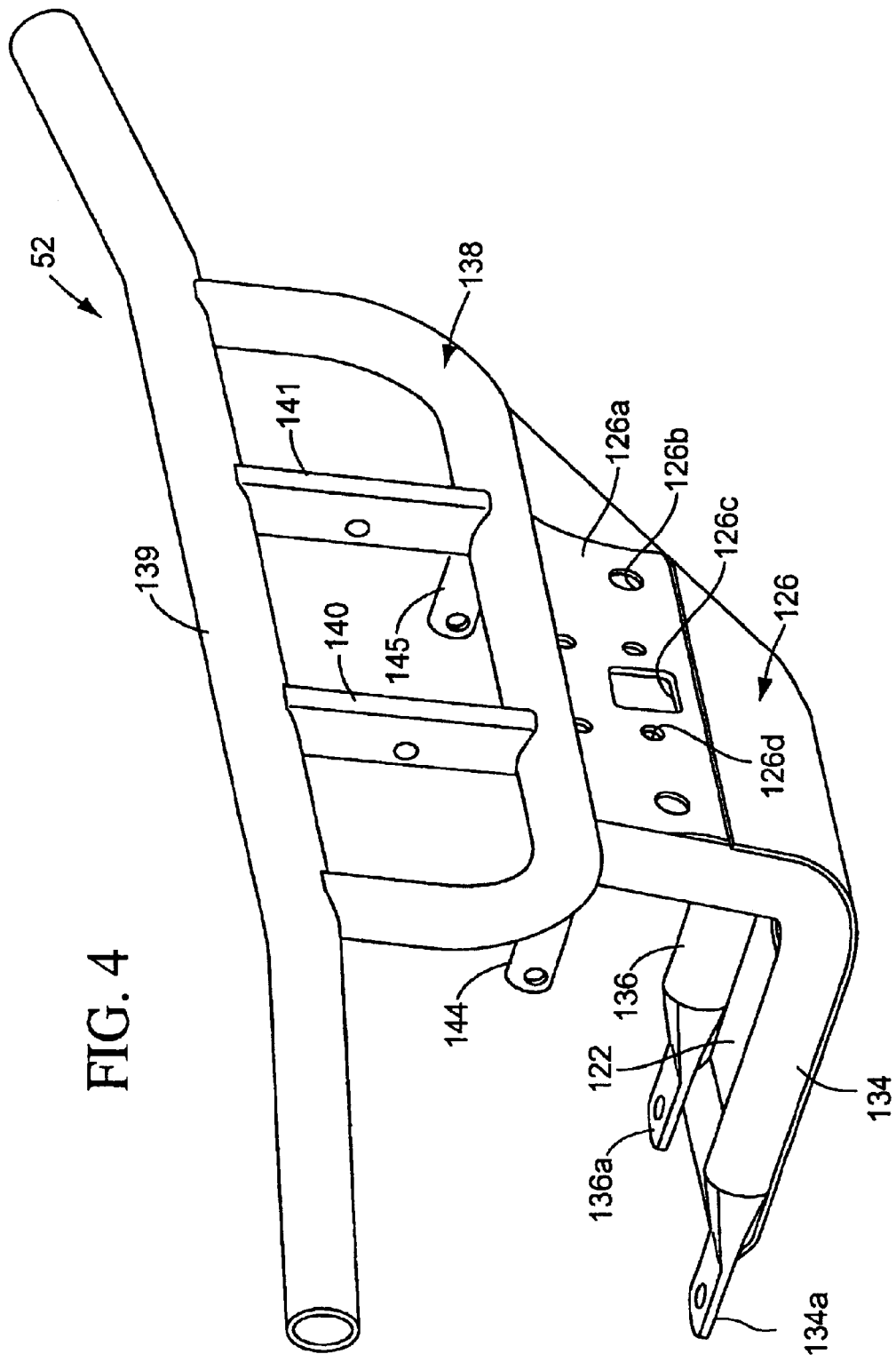
FIG. 4 is a perspective view of a bumper assembly taken from utility vehicle shown in FIG. 1.
Figure 11:
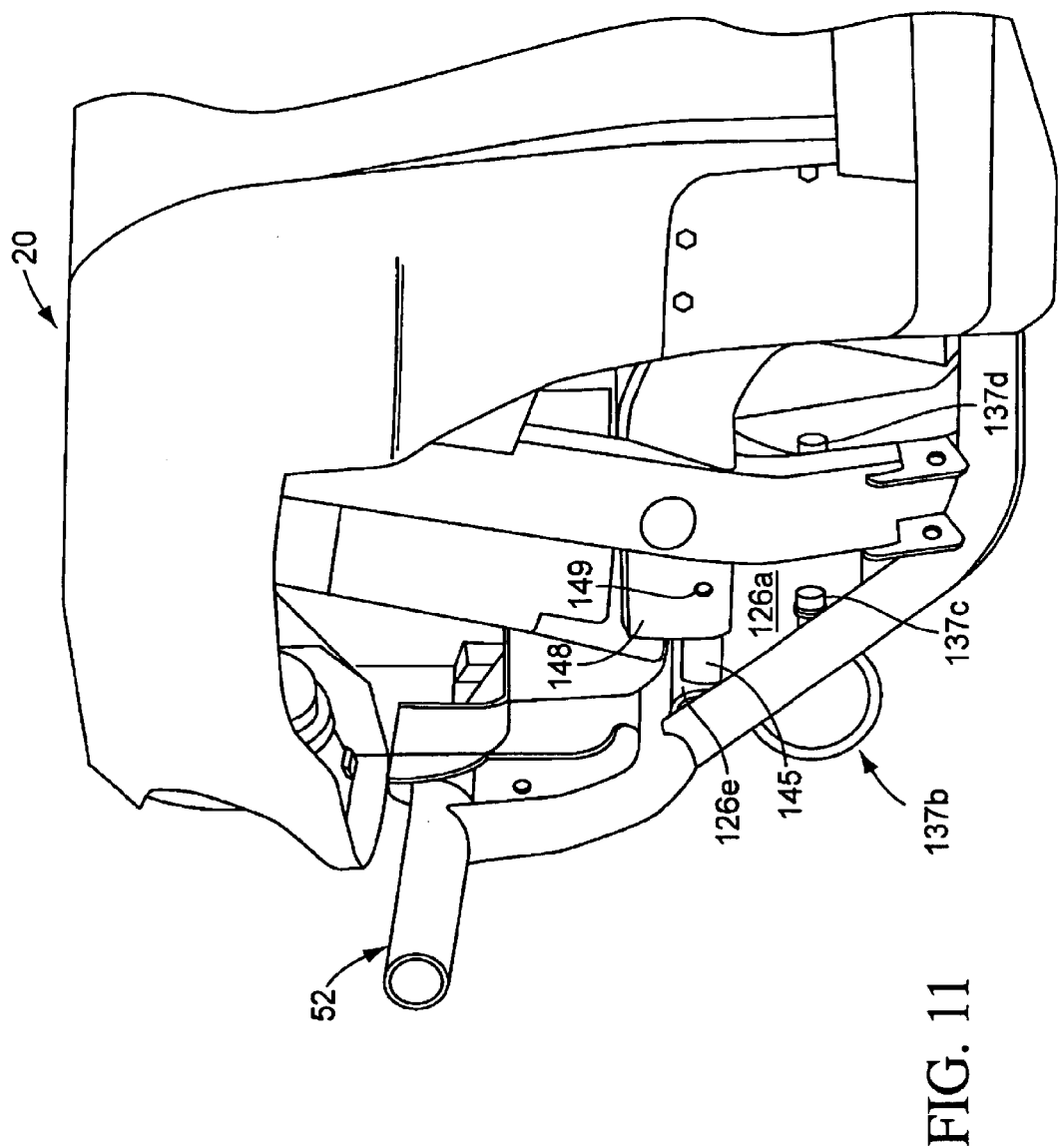
FIG. 11 is an enlarged, fragmentary rear perspective view of a portion of the vehicle of FIG. 1.

As shown in FIGS. 2 and 4, the bumper assembly 52 includes a substantially horizontal guard plate 122 fit between the rails 84, 86 and fixed to substantially L-shaped tubular members 134, 136 (FIG. 4). The guard plate 122 can be welded to the members 134,136. The members 134, 136 include tabs 134a, 136a (FIG. 4) that are secured by fasteners (not shown) to the chassis 24. A substantially upright guard plate 126 extends between the members 134,136 of the bumper assembly 52. The guard plate 126 includes a connection plate 126a for attachment of accessories, such as rings 137a, 137b shown in FIGS. 2 and 3. The rings 137a, 137b have threaded shanks which penetrate the plate 126a and receive nuts 137c, 137d on a rear side of the plate 126a (FIG. 11). The connection plate 126a can provide attachment locations for a front winch or receiver hitch, tie down rings for tying down the vehicle and/or for vertical slinging, a lift unit for a front implement, a front brush guard, additional front ballast weight, or car carrier tie down hooks. Accordingly, an appropriate quantity of holes 126b, 126c, 126d, of appropriate shape and size, can be provided through the connection plate 126a.

FIG. 4 shows the tubular members 134,136 connect to a U-shaped bumper part 138 which connects to an upper beam 139 of the bumper assembly 52. Two substantially upright attachment plates 140,141 connect between the upper beam 139 and the U-shaped part 138. The plates 140,141 include holes for receiving pins 142,143 (FIG. 5) for attachment of the bumper assembly 52 to the frame assembly 80. The bumper assembly 52 further includes rearward extending tubular members 144, 145. The rearward extending tubular members 144, 145 are welded or otherwise fixed to a rear contoured portion 126e of the connection plate 126a (FIG. 11). The rearward extending tubular members 144, 145 include holes for attachment of the members 144,145, and thus the bumper assembly 52 to portions of the chassis 24. Each member 144,145 fits within an open end of a rectangular tube-shaped chassis rail 146, 148 (FIGS. 2, 3 and 11) and is secured thereto by a fastener, such as a bolt (not shown) that inserts through a through hole 147, 149 that is common to the respective rail 146, 148 and the respective member 144,145. The bolts penetrate both the respective rail 146, 148 and the respective member 144,145 and are secured by nuts (not shown).

The bumper assembly 52 is preferably substantially composed of steel and rigid connections between members are preferably made by welding or fasteners.

Figure 5:
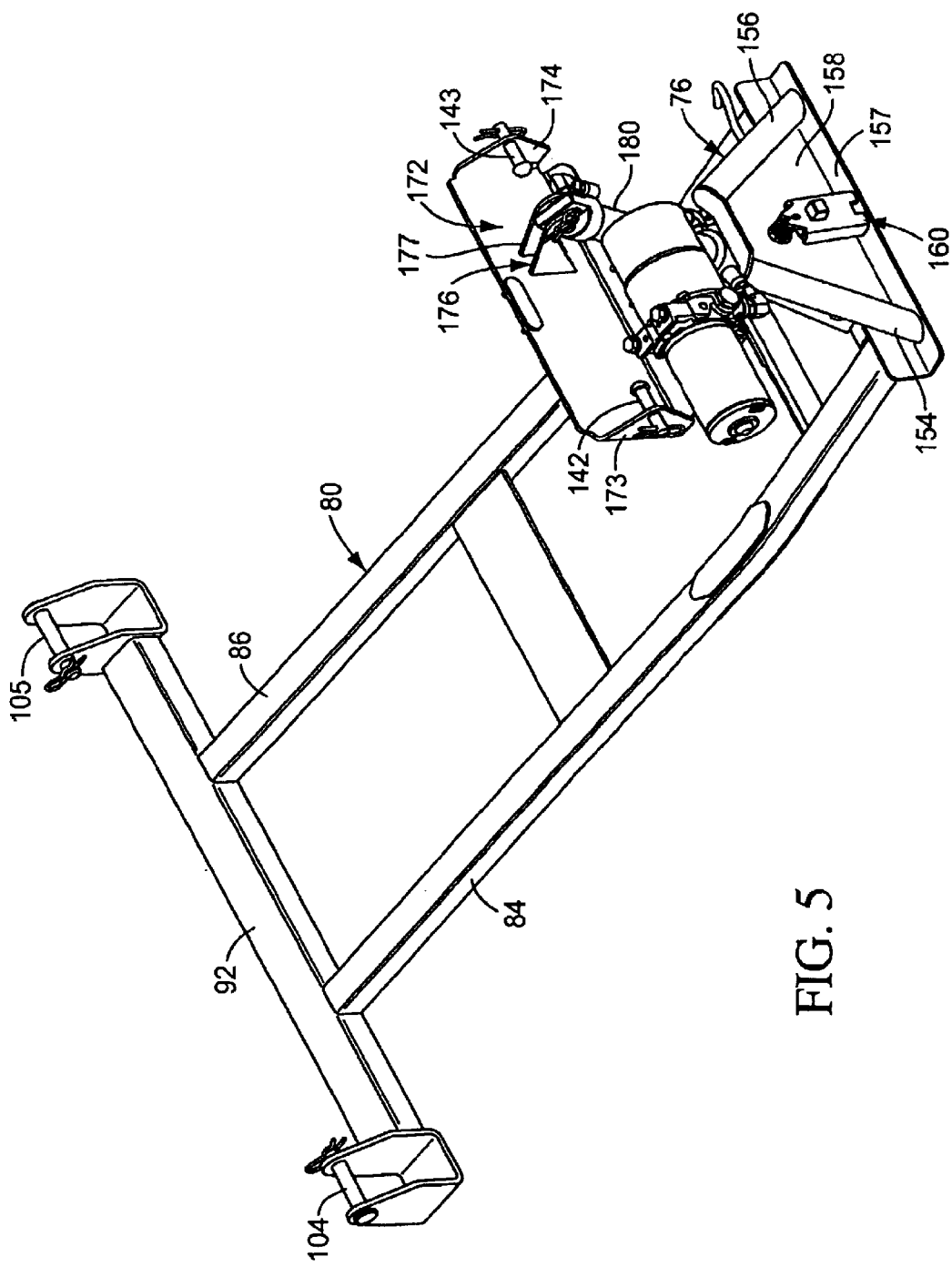
FIG. 5 is a perspective view of a frame assembly taken from the utility vehicle of FIG. 1.
Figure 6:
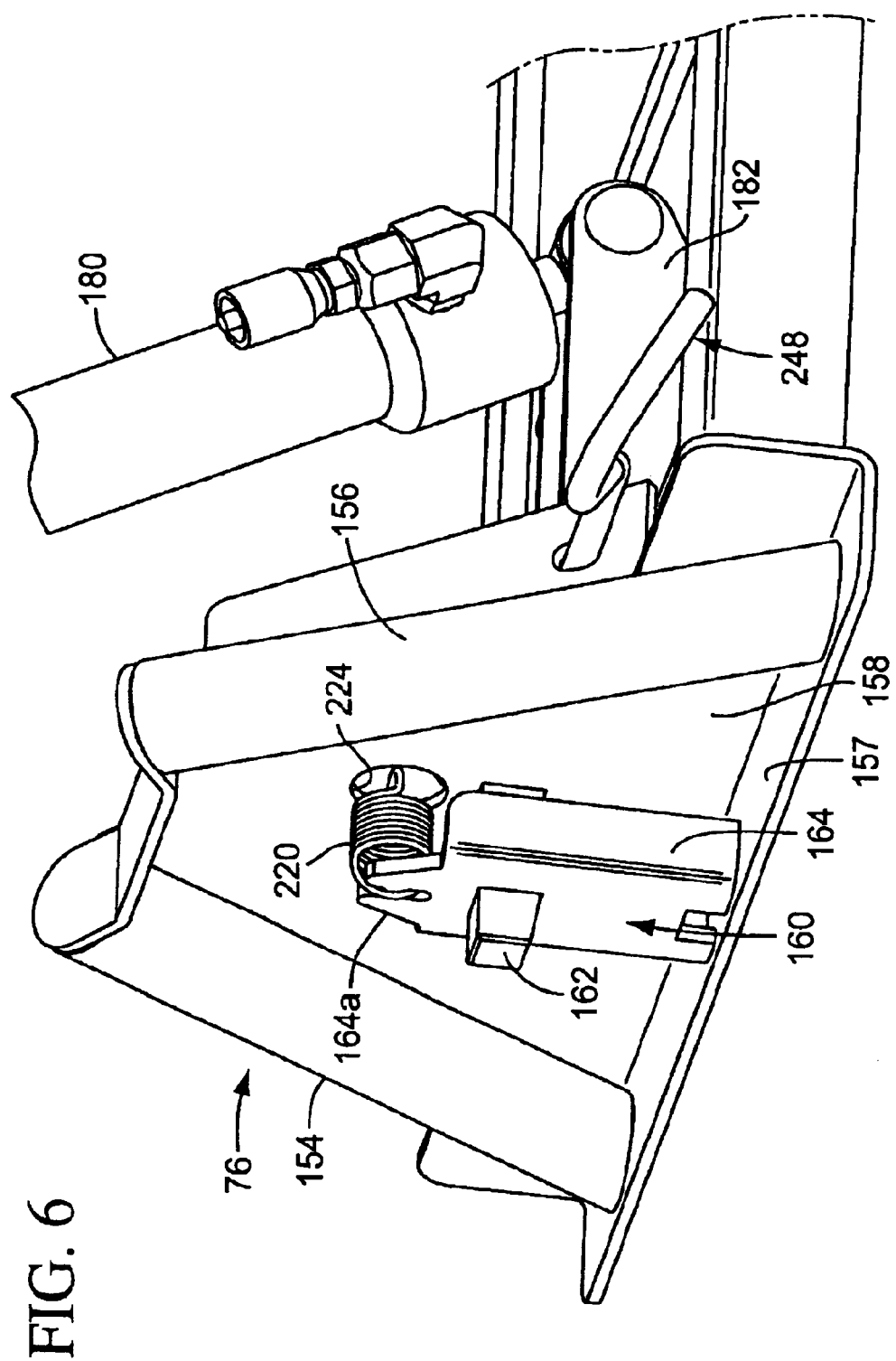
FIG. 6 is an enlarged, fragmentary, front perspective view of a portion of the frame assembly shown in FIG. 5.

As illustrated in FIGS. 3, 5 and 6, the attachment bracket 76 includes a substantially tapered or triangular face comprising angled columns 154,156 fixed to an angle bracket 157. A back plate 158 substantially closes the area between the columns 154,156 and the bracket 157. For rigidity, the angle bracket 157, the back plate 158 and the columns 154, 156 are all welded together. The hydraulic pump assembly 54 is mounted to a U-shaped bracket 170 that extends from a support plate 172.

As shown in FIG. 6, a latch assembly 160 is mounted on the angle bracket 157. The latch assembly 160 includes a latch element 162 extending through a body 164. The latch element 162 is movable through the body 164. The body 164 is fixed to the bracket 157 and/or the back plate 158.

Figure 7:
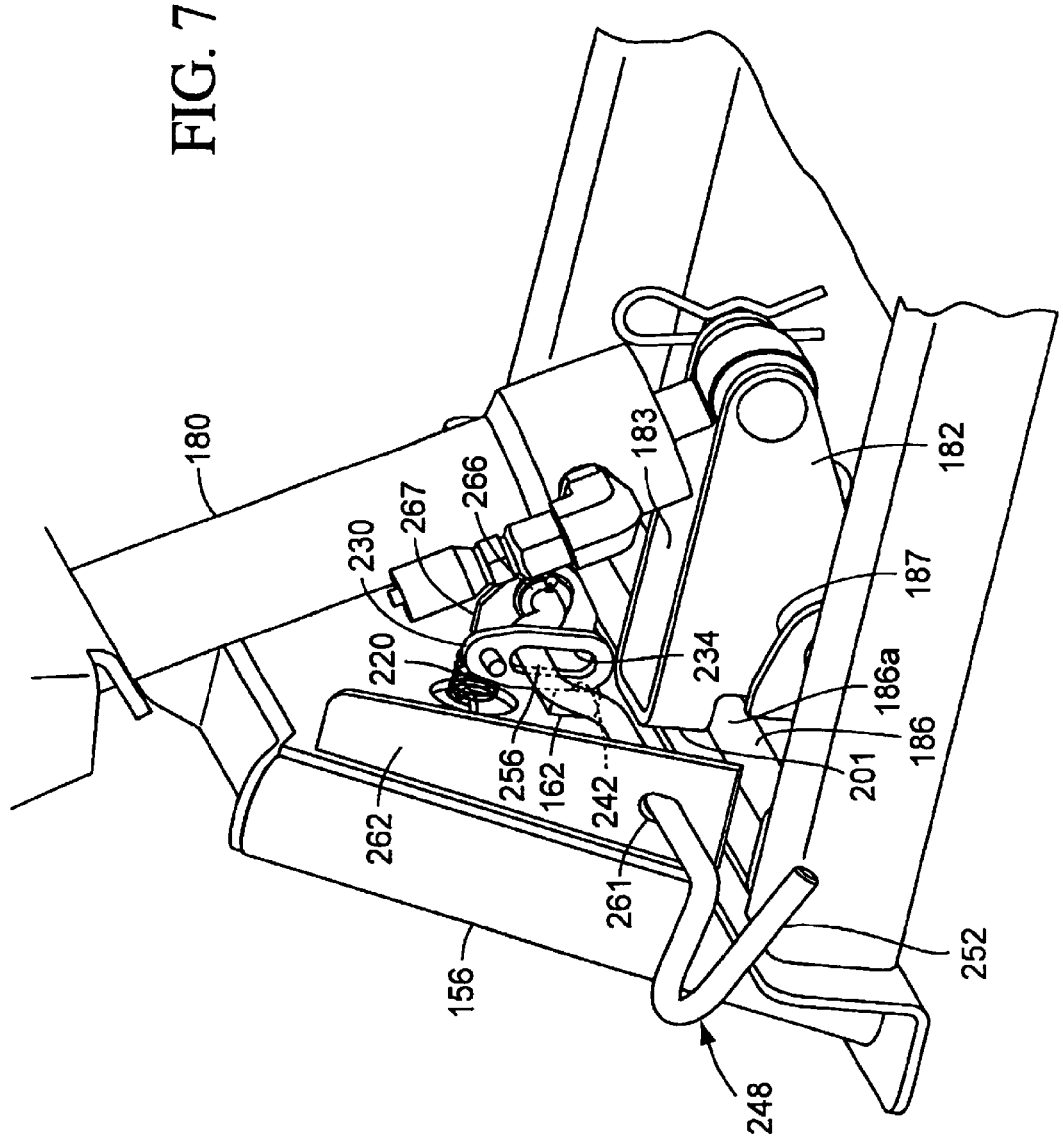
FIG. 7 is an enlarged, fragmentary, rear perspective view of a portion of the frame assembly shown in FIG. 5.

As illustrated in FIGS. 5–7, the support plate 172 includes side plates 173,174 that have holes. The holes are in registry with the holes of the plates 140,141 when the bumper assembly is installed, such that the pins 142,143 received through the registered holes connect the plates 140,141 to the side plates 173,174, respectively. The support plate 172 also includes trunnion plates 176,177 fixed thereto that are pivotally mounted to an end of a hydraulic cylinder 180.

Figure 8:
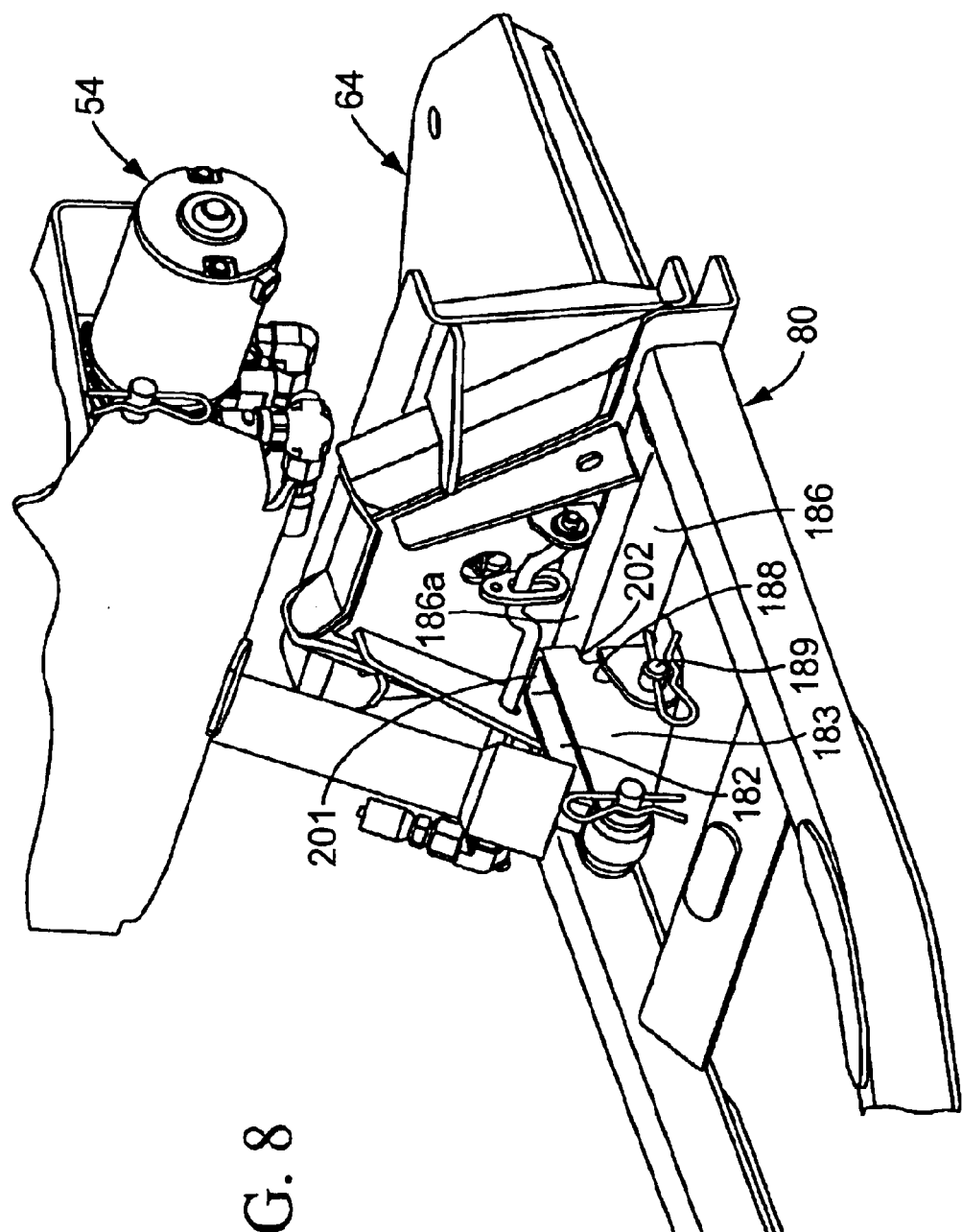
FIG. 8 is an enlarged, fragmentary, rear perspective view of a portion of the frame assembly taken from FIG. 1.
Figure 9:
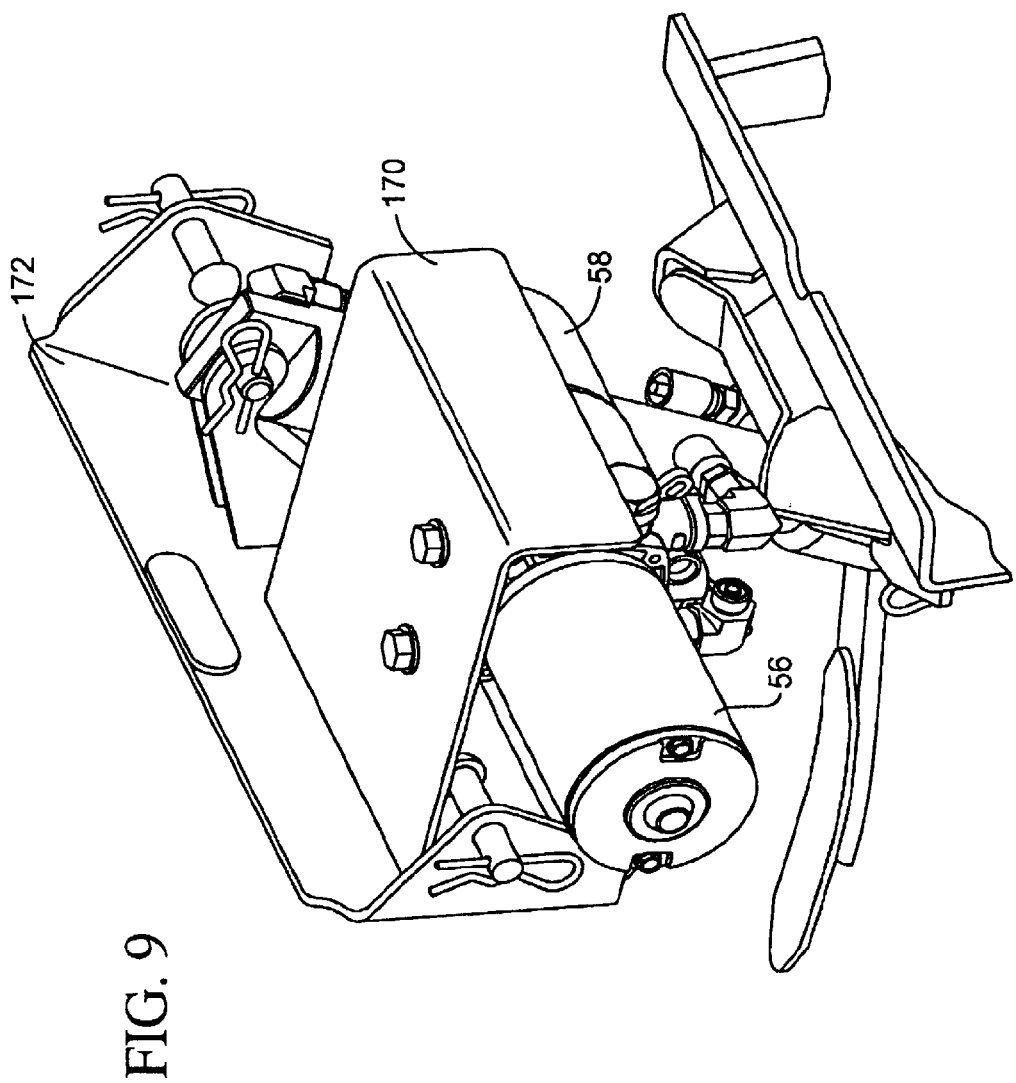
FIG. 9 is a front perspective view of a portion of the frame assembly shown in FIG. 5.

As illustrated in FIGS. 7 and 8, an opposite end of the cylinder 180 is pivotally mounted to trunnion plates 182,183 which are pivotally connected to a cross member 186 via lugs 187, 188 and a pin 189. The plates 182,183 are connected by a bridge wall 201. The bridge wall 201 and/or edge portions of the plates 182,183 provide a bottom surface 202 that "bottoms" or rests on a top surface 186a of the cross member 186 when the cylinder 180 is retracted to lift the attachment bracket 76. This arrangement effectively permits only an upward lifting force to be transmitted from the cylinder 180 onto the cross member 186. The cylinder 180 is prevented from exerting any unwanted downward hydraulically-generated force on the cross member 186, as the plates 182,183 will rotate freely about the pin 189 when subject to downward force from the cylinder 180. The cylinder 180 will reach an extension limit before downward force is exerted on the cross member 186.

When assembled, extension of the cylinder 180 allows the attachment bracket 76 to be lowered by gravity. When the cylinder 180 is contracted, the attachment bracket 76 is raised by a lifting force exerted on the plates 182,183 via the pin 189 and a resulting pivoting of the rails 84, 86.

The support plate 172 is permitted to pivot a small amount about the pins 142,143. Such a pivoting may not be detrimental and may in fact be advantageous to reduce stress on parts during operation of the implement, for example the blade 64.

FIGS. 6 through 8 describe the latch assembly 160 in more detail. The latch element 162 can slide through a thickness of the body 164. As illustrated in FIG. 6, a spring 220 is hooked to an end 164a of the body 164 and passes through an opening 224 through the back plate 158. As illustrated in FIG. 7, the spring 220 is hooked into a hole 229 in a follower 230. The follower 230 includes a vertical slot 234. The latch element 162 passes freely through the body 164, through a hole in the back plate 158 and is welded to the follower 230 at the location 242.

A disengage lever 248 includes a handle 252 and a crank portion 256 that fits into the slot 234 of the follower 230. The lever 248 is journaled through a hole 261 in a side plate 262 and through a hole 266 in a lug 267. A bearing and retainer pin can be provided on the disengage lever at the hole 266. In operation, rotation of the handle 252 causes the crank portion 256 to displace the follower 230 rearward against tensile force from the spring 220, to retract the latch element 162. The latch element 162 is retracted sufficiently to disengage from the hole in the implement base. The implement base can then be lifted upwardly to disengage from the attachment plate. When a manual force is removed from the handle 252, the spring 220 acts to return the latch element 162 to its extended position and acts to return the disengage lever 248 to its orientation shown in FIG. 7.

Figure 12:
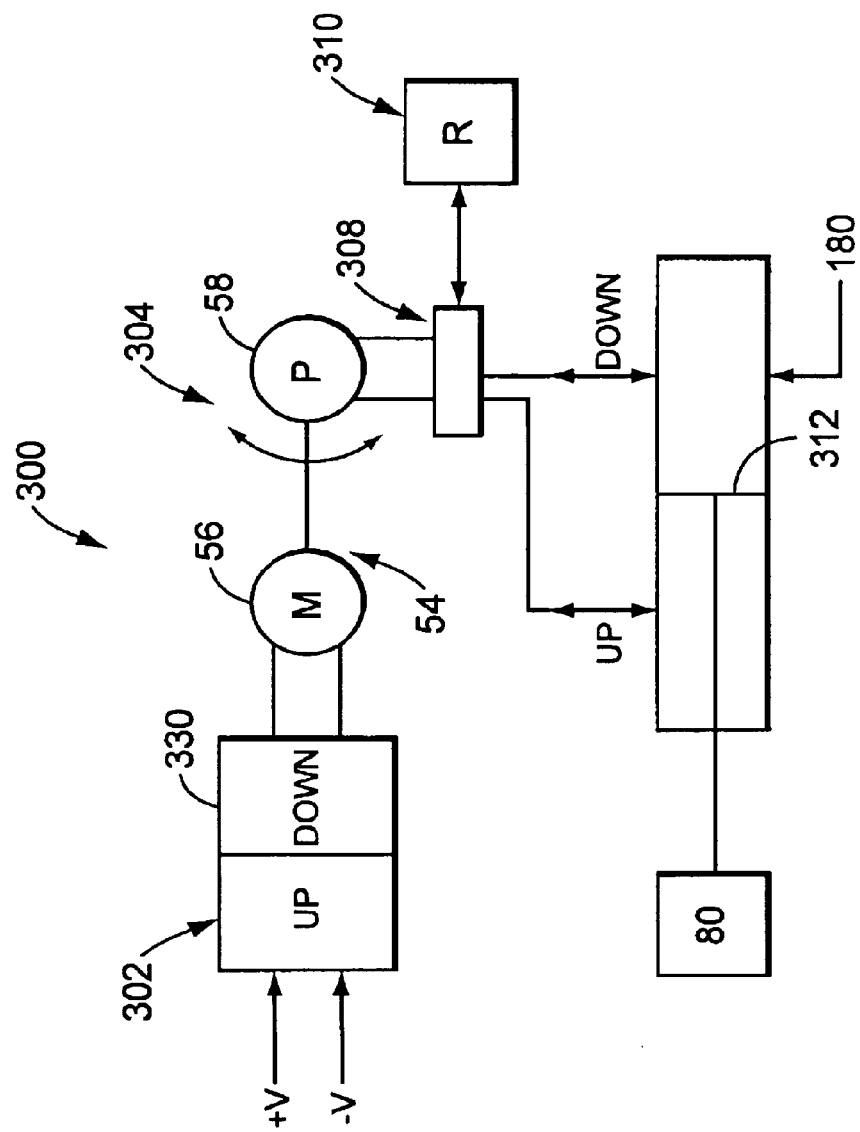
FIG. 12 is a schematic diagram of a hydraulic control system for operation of a lift mechanism for the implement of the vehicle of FIG. 1.

FIG. 12 is a schematic diagram of a hydraulic system 300 used to control the cylinder 180. The system 300 includes an electrical control system 302, and a hydraulic actuation system 304. The actuation system 304 includes the motor 56, the pump 58, valving system 308, a reservoir 310, and tubing. Preferably, the actuation system 304 is a self-contained commercially available unit such as a 108 SERIES self-contained hydraulic power unit, available from Parker Hannifin Corporation, Oildyne Division, of Minneapolis, Minn., U.S.A.

The cylinder 180 is hydraulically-connected to the pump 58 via the valving system 308. The valving system 308 can include selective valves, porting and routing to allow pressurized hydraulic fluid to be delivered to either side of a piston 312 within the cylinder 180. The valving system 308 can also provide for thermal and pressure relief as is known. The valving system 308 and tubing allow the pump to take suction from the reservoir 310 and allow hydraulic fluid from the cylinder 180, from a side of the piston wherein oil is being compressed by the piston, to return to the reservoir 310 or to the suction of the pump 58. Necessary hardware components such as oil strainers are not shown for simplicity, but their use would be readily understood by one of skill in the art and would be provided in the commercially available unit.

The electrical control system 302 can be powered by positive and negative voltage conductors, such as a positive 12 volt DC (direct current) supply and a negative 12 volt DC supply. A switch 330 is provided to select voltage polarity to the motor 56 in order to select a rotary direction of the motor 56. Preferably the switch is a DPDT (double pole, double throw) center off toggle switch, usable up to 20 amps. By selecting the direction of rotation of the motor 56 and the pump 58, pressurized fluid is directed to either side of the piston 312 to effect either up or down movement of the frame assembly 80. For whichever side of the piston that does not receive pressurized hydraulic fluid, the associated tubing for that side acts as a return line for hydraulic fluid to be forced, by movement of the piston 312 to return to the reservoir 310 or to the suction of the pump 58.

In operation, the switch 330 would be located in the operator station, and selective activation of the switch 330 would instigate the rotary movement and direction of the pump 58. By operation of the pump 58, pressurized hydraulic fluid causes the cylinder to be selectively elongated or contracted to pivot the frame assembly 80 about the pins 104, 105, to adjust the elevation of the front-mounted implement.

Figure 13:
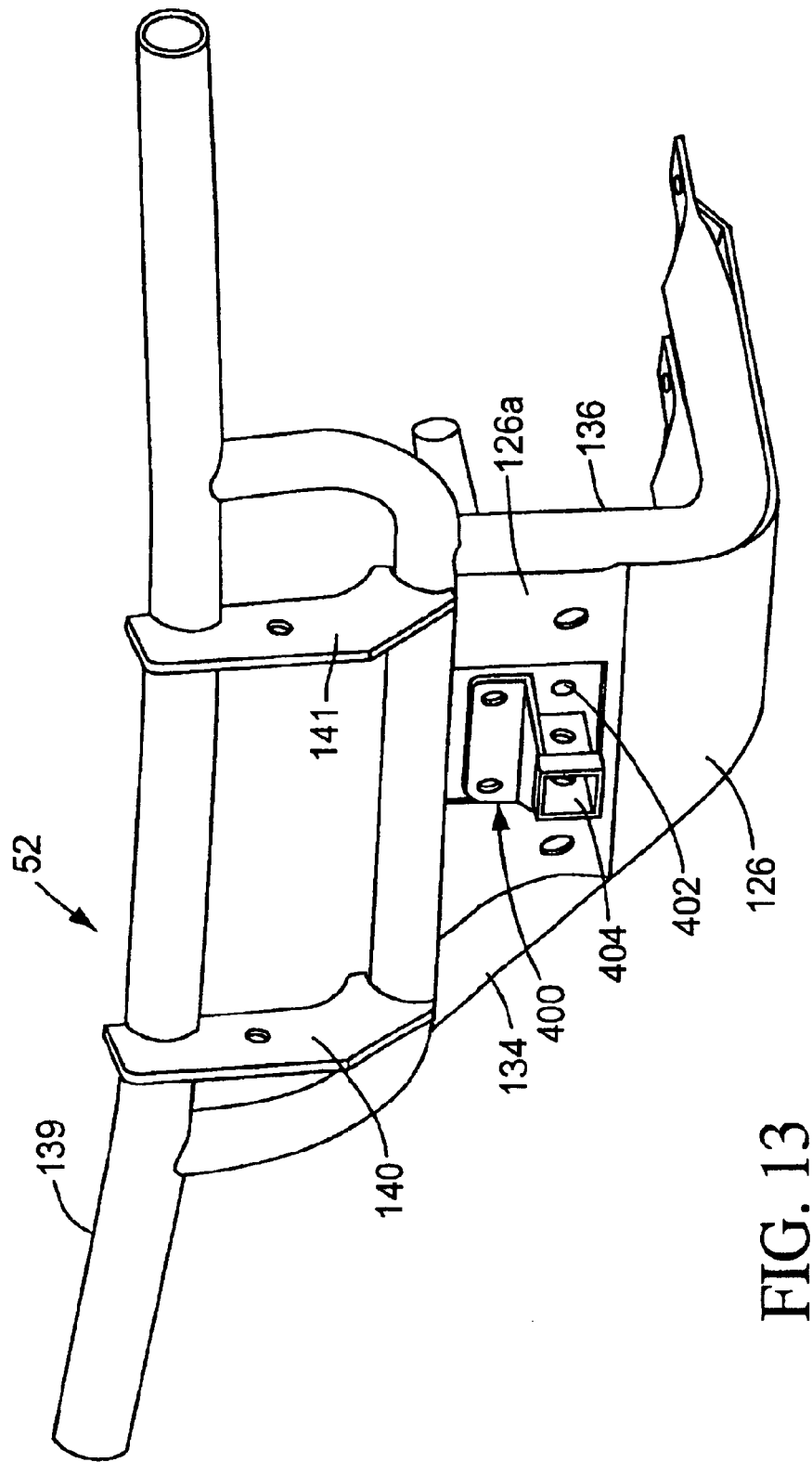
FIG. 13 is a perspective view of the bumper assembly showing a receiver hitch attached thereto.

FIG. 13 illustrates a receiver hitch 400 bolted to the connection plate 126a. The receiver hitch 400 includes a base 402 that is bolted to the connection plate 126a and a rectangular tube 404 that is welded to the base 402 and extends through the base 402 and through a rectangular hole 126c (FIG. 4) of the connection plate 126a.

Figure 14:
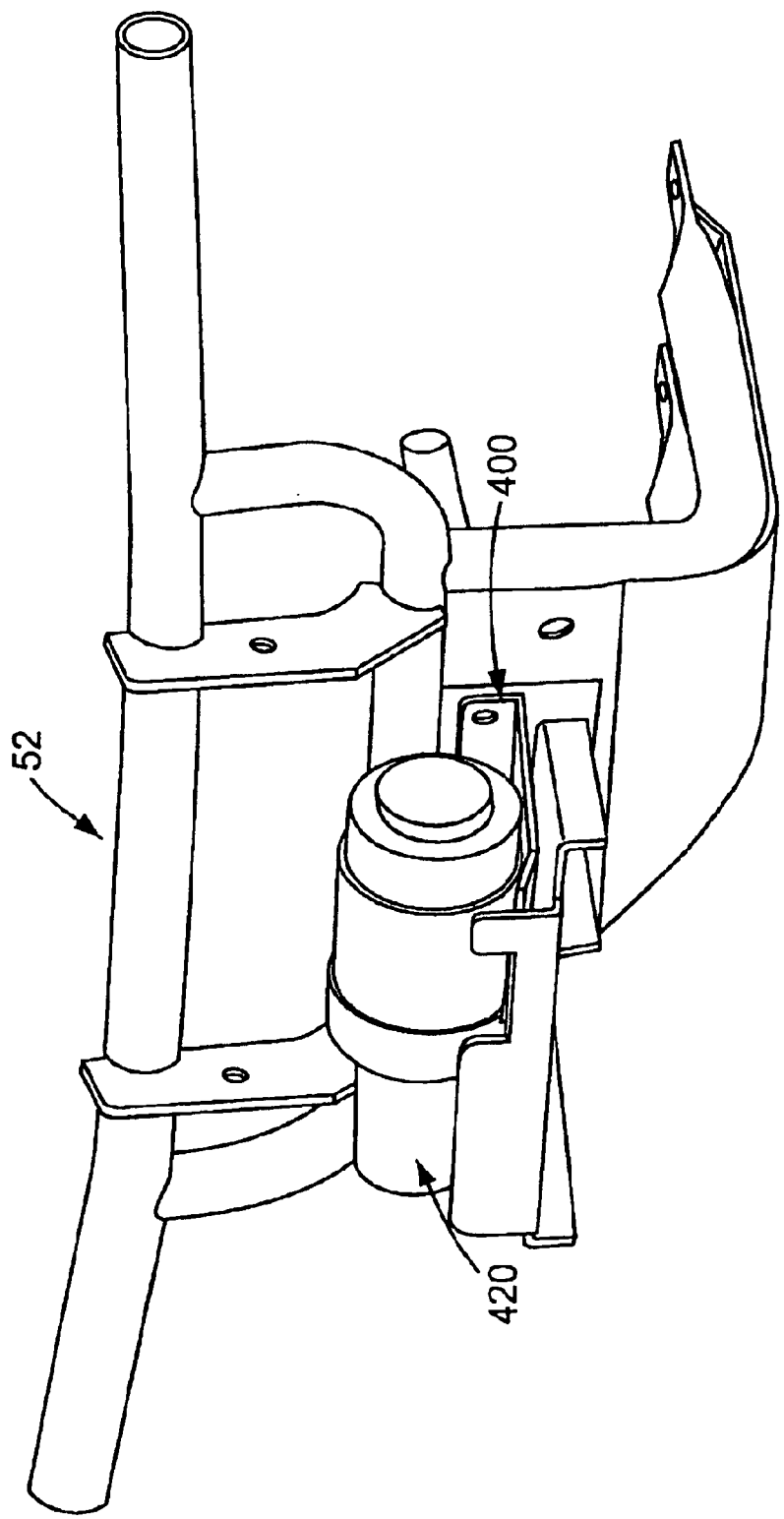
FIG. 14 is a perspective view of the bumper assembly of FIG. 13 showing a winch assembly coupled to the receiver hitch.
Figure 15:
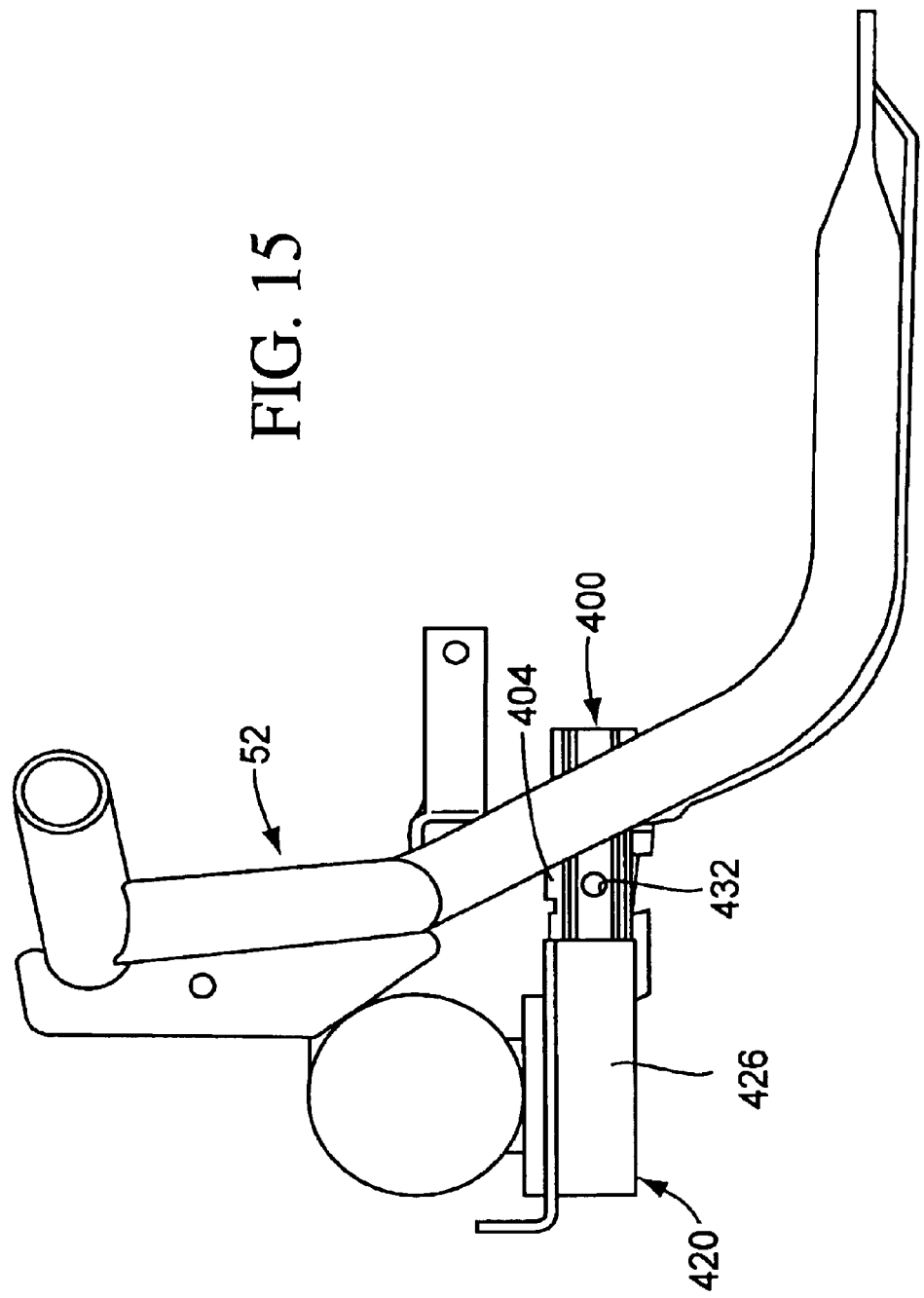
FIG. 15 is a right side view of the bumper assembly of FIG. 14.

FIG. 14 illustrates a winch assembly 420 coupled to the receiver hitch 400. As illustrated in FIG. 15 the winch assembly 420 includes an elongated connection element such as a rectangular tube 426 that inserts into the rectangular tube 404 of the receiver hitch 400. A through hole 432 that penetrates through both rectangular tubes 404, 426 is provided for a pin (not shown) that locks the two tubes 404, 426 together.

Figure 16:
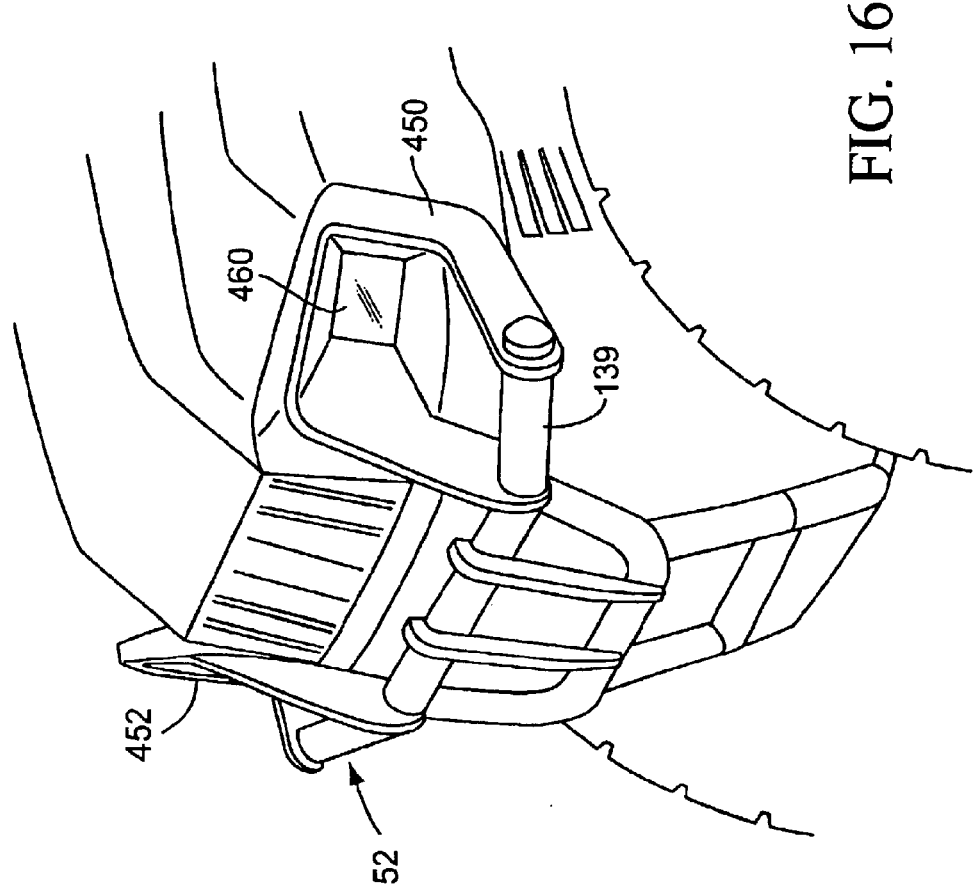
FIG. 16 is a fragmentary perspective view of the bumper assembly on a vehicle and illustrating headlamp brush guards carried by the bumper assembly.

FIG. 16 illustrates headlamp guards or "brush guards" 450, 452 carried on the upper beam 139 of the bumper assembly 52. The guards 450, 452 are substantially mirror-image identical and are secured to the beam 139 by welding, known method. The guards 450, 452 surround the headlamps 460 and protect the headlamps from brush (vegetation) or other obstacles.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. An implement attachment arrangement for a utility vehicle, comprising
   a vehicle chassis supported in part on a pair of front wheels;
   an elongated structure having a front portion and a rear portion, said elongated structure pivotally connected at said rear portion to said vehicle chassis behind said front wheels, and supported by said vehicle chassis to be vertically adjustable at said front portion of said elongated structure, in front of said front wheels, said elongated structure extending longitudinally between said front wheels, said elongated structure providing an implement mounting bracket at said front portion of said elongated structure;
   an implement having a base that is engageable to said implement mounting bracket;
   a support plate removably mounted to a front of said vehicle chassis; and
   a mechanism to vertically adjust the elevation of said front portion of said elongated structure, said mechanism comprising a hydraulic cylinder extendable and retractable and operatively connected between said chassis and said front portion, and a hydraulic pump hydraulically-connected to said hydraulic cylinder said hydraulic cylinder and said hydraulic pump being removably mounted to said support plate allowing installation of said hydraulic cylinder and said hydraulic pump onto said vehicle chassis as an integral assembly with said support plate.

2. The arrangement of claim 1, wherein said implement mounting bracket couples to said implement base in part by a relative vertical movement therebetween, said relative vertical movement controlled by said mechanism.

3. The arrangement of claim 1, wherein said support plate is removably mounted to said vehicle chassis by at least one pin.

4. The arrangement of claim 1, further comprising a bumper assembly fastened to said vehicle chassis on a front thereof, and said support plate is removably fastened to said bumper assembly.

5. The arrangement of claim 4, wherein said bumper assembly includes two spaced-apart attachment portions and said support plate comprises two spaced-apart connecting portions that each fit adjacent to one of said attachment portions, and including a hole in each of said attachment portions and connecting portions, and two pins, each pin penetrating through said two holes of each respective pair of said adjacent attachment portion and connecting portion, to mount said support plate to said bumper assembly.

6. An implement attachment arrangement for a utility vehicle, comprising:
   a vehicle chassis supported in part by a pair of front wheels;
   an elongated frame pivotally attached to said vehicle chassis behind said front wheels and extending forward of said front wheels;
   an attachment bracket extending outward from said vehicle chassis, mounted to said elongated frame, said bracket comprising an attachment plate;
   an implement having a base, said base configured to couple with said attachment plate;
   a bumper assembly fixed to said vehicle chassis;
   a support plate removably mounted to said bumper assembly; and
   a powered adjustment mechanism and a source of power, said source of power arranged to communicate power to drive said powered adjustment mechanism, said adjustment mechanism operatively connected between said bumper assembly and said elongated frame, said attachment bracket adjustable into a desired vertical position by operation of said powered adjustment mechanism, said powered adjustment mechanism and said source of power mounted together on said support plate.

7. The arrangement of claim 6, wherein said bumper assembly comprises:
   a protective front structure extending substantially upright in front of a radiator of the utility vehicle;
   a protective bottom structure extending substantially horizontally beneath said vehicle chassis, said front and bottom structures being substantially continuous and fastened to the vehicle chassis as a unit.

8. The arrangement of claim 7, wherein said front structure comprises a horizontal bar and at least two spaced-apart substantially upright members operatively connected to the horizontal bar, said two substantially upright members operatively connected to said bottom structure, and said front structure comprises a guard plate connected between said two substantially upright members, substantially closing an area defined between said two substantially upright members, said horizontal bar and said bottom structure.

9. The arrangement of claim 6, wherein said bumper assembly comprises a front protective structure and said support plate is removably fastened to said front protective structure, and said powered adjustment mechanism comprises a hydraulic cylinder operatively connected between said support plate and said attachment bracket.

10. The arrangement of claim 6, wherein said source of power comprises a hydraulic pump and an electric motor, said electric motor coupled to said hydraulic pump to drive said hydraulic pump, said powered adjustment mechanism comprising a hydraulic cylinder operatively connected between said bumper assembly and said elongated frame, said hydraulic pump hydraulically-connected to said hydraulic cylinder to selectively extend or retract said hydraulic cylinder.

11. An implement attachment arrangement for a utility vehicle, comprising:
   a vehicle chassis supported in part by a pair of front wheels;

an elongated frame pivotally attached to said vehicle chassis behind said front wheels and extending forward of said front wheels;

an attachment bracket extending outward from said vehicle chassis, mounted to said elongated frame, said bracket comprising an attachment plate;

an implement having a base, said base configured to couple with said attachment plate;

a bumper assembly fixed to said vehicle chassis; and a powered adjustment mechanism connected between said bumper assembly and said elongated frame, said attachment bracket adjustable into a desired vertical position by operation of said powered adjustment mechanism;

wherein said bumper assembly comprises:

a protective front structure extending substantially upright in front of a radiator of the utility vehicle;

a protective bottom structure extending substantially horizontally beneath said vehicle chassis, said front and bottom structures being substantially continuous and fastened to the vehicle chassis as a unit;

wherein said front structure comprises a horizontal bar and at least two substantially upright members separated by a gap operatively connected to the horizontal bar, said two substantially upright members operatively connected to said bottom structure, and said front structure comprises a guard plate connected between said two substantially upright members, bridging the gap between said two substantially upright members; and wherein said guard plate provides attachment points for accessories.

12. An implement attachment arrangement for a utility vehicle, the utility vehicle including a chassis that supports a front-mounted radiator, comprising:

a protective front structure extending substantially upright in front of the radiator of the utility vehicle;

a protective bottom structure extending substantially horizontally beneath the chassis of the utility vehicle;

wherein said front structure comprises a horizontal bar and at least two substantially upright members operatively connected to the horizontal bar with a space between said two substantially upright members, said two substantially upright members operatively connected to said bottom structure, and a vertically oriented, forward facing plate connecting said two substantially upright members, substantially bridging the space between said two substantially upright members, wherein said plate is configured to attach at least two attachment devices for attaching one or more selected implements.

13. The implement attachment arrangement according to claim 12 wherein said front and bottom structures are substantially continuous and fastened to the vehicle chassis as a unit.

14. The implement attachment arrangement according to claim 12 wherein said bottom structure comprises two spaced-apart substantially horizontal rails with an area therebetween and a bottom plate arranged between said two substantially horizontal rails, substantially closing the area between said two substantially horizontal rails.

15. The implement attachment arrangement according to claim 12, comprising a substantially U-shaped bumper frame member connected between said horizontal bar and said two substantially upright members.

16. The implement attachment arrangement according to claim 12, wherein one of said attachment devices comprises a ring.

17. The implement attachment arrangement according to claim 12, wherein one of said attachment devices comprises a receiver hitch.

18. The implement attachment arrangement according to claim 17, wherein said receiver hitch includes a horizontal tube having an open end shaped and configured for receiving an elongated connection element of one implement of said one or more selected implements.

19. An implement attachment arrangement for a utility vehicle, comprising:

a vehicle chassis supported in cart on a pair of front wheels;

an elongated structure having a front portion and a rear portion, said elongated structure pivotally connected by a pivot connection at said rear portion to said vehicle chassis behind said front wheels, and supported by said vehicle chassis to be vertically adjustable at said front portion of said elongated structure, in front of said front wheels, said elongated structure extending longitudinally between said front wheels, said elongated structure providing an implement mounting bracket at said front portion of said elongated structure;

an implement having a base that is engageable to said implement mounting bracket;

a mechanism to vertically adjust the elevation of said front portion of said elongated structure by pivoting said elongated structure about said pivot connection to said vehicle chassis that is behind said front wheels, said mechanism comprising a hydraulic cylinder extendable and retractable and operatively connected between said chassis and said front portion;

a bumper assembly mounted to said vehicle chassis, and said elongated structure is supported by said chassis at said front portion thereof by a connection of said hydraulic cylinder between said bumper assembly and said front portion of said elongated structure;

wherein said bumper assembly includes two spaced-apart attachment portions and said support plate comprises two spaced-apart connecting portions that each fit adjacent to one of said attachment portions, and including a hole in each of said attachment portions and connecting portions, and two pins, each pin penetrating through two said holes of each respective pair of said adjacent attachment portion and connecting portion, to mount said support plate to said bumper assembly.

* * * * *

UNITED STATES PATENT AND TRADEMARK OFFICE
CERTIFICATE OF CORRECTION

PATENT NO. : 6,925,735 B2  Page 1 of 1
APPLICATION NO. : 10/232836
DATED : August 9, 2005
INVENTOR(S) : Nicholas Hamm and Steven Paul Dobrot It is certified that error appears in the above-identified patent and that said Letters Patent is hereby corrected as shown below:

Column 10, line 22, change "cart" to --part--.

Signed and Sealed this

Twelfth Day of September, 2006

JON W. DUDAS
*Director of the United States Patent and Trademark Office*